United States Patent [19]
Rosin

[11] 3,934,845
[45] Jan. 27, 1976

[54] GUN BAY PRESSURE RELIEF DEVICE

[75] Inventor: Alexander Rosin, Torrance, Calif.

[73] Assignee: Northrop Corporation, Los Angeles, Calif.

[22] Filed: Mar. 17, 1975

[21] Appl. No.: 559,147

[52] U.S. Cl. ........................ 244/129 D; 89/37.5 R
[51] Int. Cl.² ........................................ B64C 1/14
[58] Field of Search ............. 89/37.5 R; 49/141, 31, 49/394; 98/121 A, 40 V; 244/129 R, 129 D, 119, 53 B, 121, 130

[56] References Cited
UNITED STATES PATENTS

| 2,641,967 | 6/1953 | Bussiere et al. | 89/37.5 R |
| 3,453,777 | 7/1969 | Reilly | 49/141 |

FOREIGN PATENTS OR APPLICATIONS

| 541,391 | 3/1956 | Italy | 89/37.5 R |

*Primary Examiner*—Trygve M. Blix
*Assistant Examiner*—Paul E. Sauberer
*Attorney, Agent, or Firm*—William W. Rundle; Willard M. Graham

[57] ABSTRACT

Pressure relief louvers for preventing damage to a combat aircraft in the event of an explosion resulting from an accumulation of gun gases in the gun bay. The pressure relief louvers are flush mounted relative to the aircraft outside surface and are hinged along their lower edges longitudinally of the aircraft, in the gun bay door. They are normally held closed by magnetic action, opening only as the result of a high pressure buildup within the gun bay. The normal upward component of in-flight air flow over the gun bay doors closes the louvers after the internal pressure subsides.

11 Claims, 4 Drawing Figures

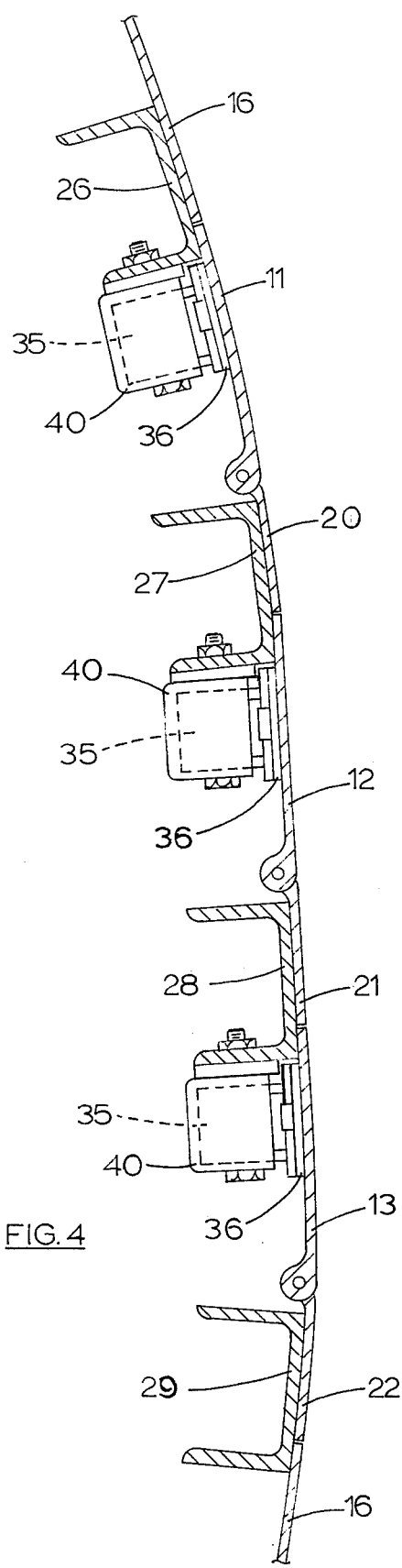
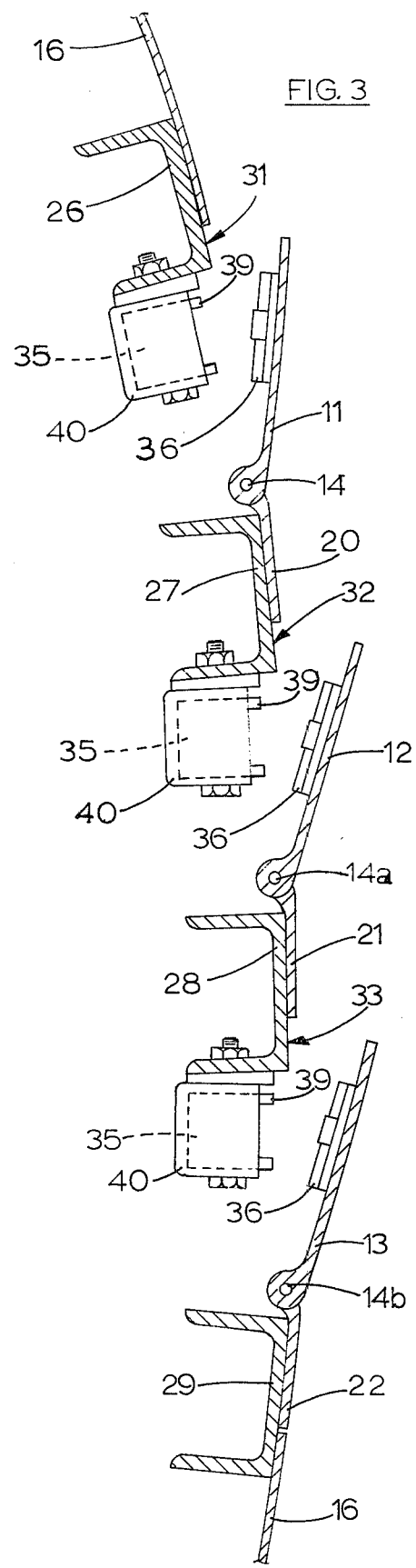

GUN BAY PRESSURE RELIEF DEVICE

BACKGROUND OF THE INVENTION

The invention herein described was made in the course of contract No. F-33657-74-C-0041 with the United States Air Force.

This invention relates to aircraft armament installations and more particularly to pressure relief louvers which provide instantaneous pressure relief in the gun bay of a combat aircraft in the event of an in-flight gun gas explosion. Gun bays of present combat aircraft are purged of gun gas by ram air openings when the aircraft is in flight and are open to the atmosphere by opening one or more large gun bay doors on the side of the aircraft adjacent to the guns when the aircraft is required to test fire its guns on the ground.

In-flight ram air is provided by the actuation of ram air inlet and outlet air scoops located beneath the forward and aft end, respectively, of the gun bay. Air from the forward scoop is forced through the gun bay, at critical locations of gun gas leakage and accumulation, flows aft through the gun bay and exits from the bottom of the aircraft by means of the aft scoop.

A potential for explosion exists when one or both of the scoops fail to operate properly or there is an excessive amount of gun gas accumulation due to a faulty gun breach or seal. Gun gas explosions in combat aircraft have in the past damaged the structural integrity of the aircraft.

BRIEF SUMMARY OF THE INVENTION

My invention relates to pressure relief louvers incorporated in the gun bay doors on the outer surface of the aircraft fuselage, for example. The louvers provide pressure relief in the event of a pressure buildup due to a gun gas explosion and thereby prevent structural damage to the aircraft.

Each pressure relief louver is essentially a narrow panel hinged along its lower edge which extends longitudinally of the aircraft, and is normally retained in the closed position, preferably by magnets located within the gun bay. The magnets coact with armature strips attached to the inside surface of the louvers and maintain the holding force necessary for proper operation of the louvers. A plurality of louvers may be arranged one above another.

It is an object of the present invention to provide a low cost highly reliable pressure relief system for an aircraft gun installation.

Another object of the invention is to provide an instantaneous pressure relief system which will automatically open instantaneously as pressure builds up due to an aircraft gun gas explosion and will automatically close when the pressure returns to normal. The closing is achieved initially by the normal direction of air flow across the louvers when in flight.

A further object is to provide such a pressure relief system with a minimum of parts and which excludes all mechanical and electrical actuating devices.

These and other objects achieved by my invention will become apparent when read with the accompanying drawings and detailed description of a specific embodiment of the invention.

BRIEF DESCRIPTION OF THE DRAWINGS

FIG. 3 is a sectional view taken on line 3—3 of FIG. 1, showing the louvers partly open.

FIG. 4 is a sectional view similar to FIG. 3, showing the louvers in their closed position.

DETAILED DESCRIPTION OF THE INVENTION

Figure 1:
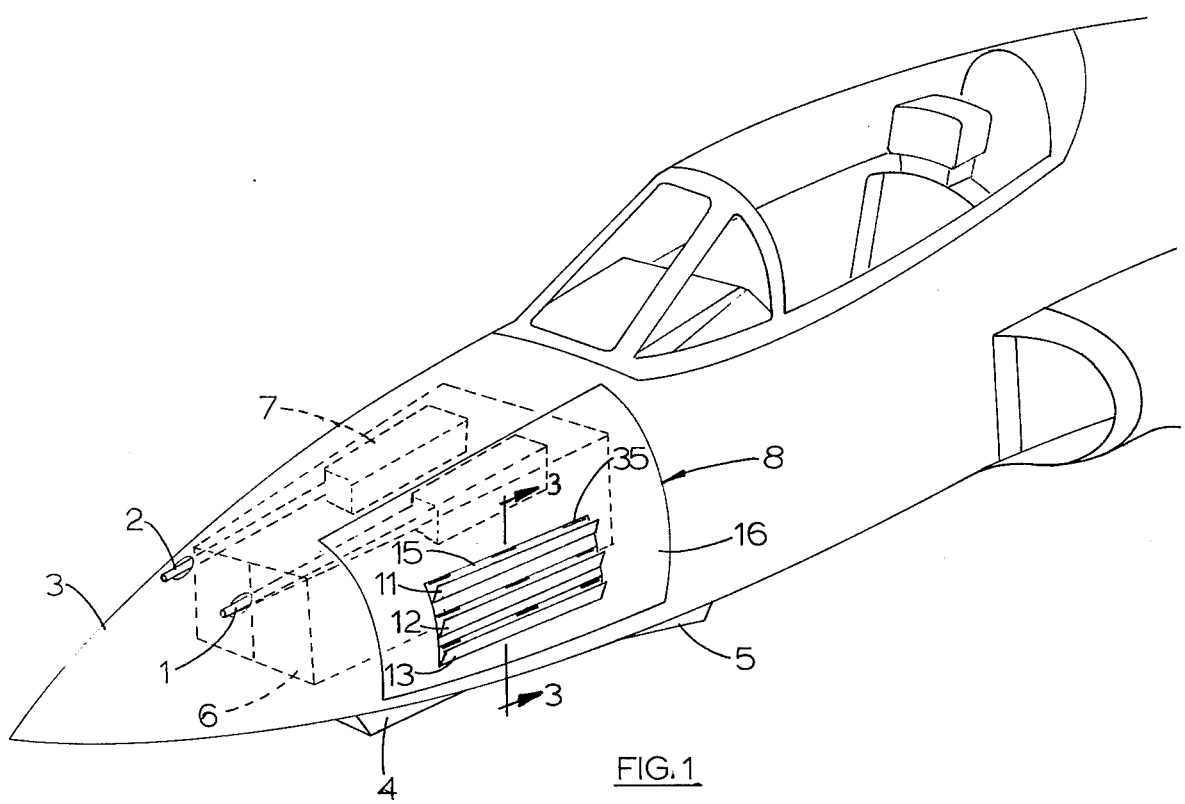
FIG. 1 is a perspective view of an aircraft forward section showing an example of the general arrangement of louvers in a gun bay door, with the louvers open.

Referring to FIG. 1, firing of guns 1 and 2 is controlled by a trigger switch on the control stick (not shown) of an aircraft 3. The trigger switch has two definite positions, first detent and second detent. The first detent activates a conventional gun gas purging system by opening a forward ram air scoop 4 and an aft air exit door 5. The second detent position of the trigger fires the guns.

Individual pressure relief systems exist for each gun in addition to scoop 4 and exit door 5 and are in no way interconnected; therefore the detailed description of the invention is directed to a left gun bay 6. It is understood that a right gun bay 7 has similar provisions as the left gun bay 6.

After gun firing, the forward scoop 4 and aft air exit door 5 are normally held open by time-delay means to allow gun gas escape prior to closing.

A large gun bay door 8 is removably attached to the aircraft 3 adjacent to the gun bay 6. Pressure relief louvers 11, 12 and 13 in the door 8 are shown in an open position such as would be the case during an explosion in gun bay 6.

Figure 2:
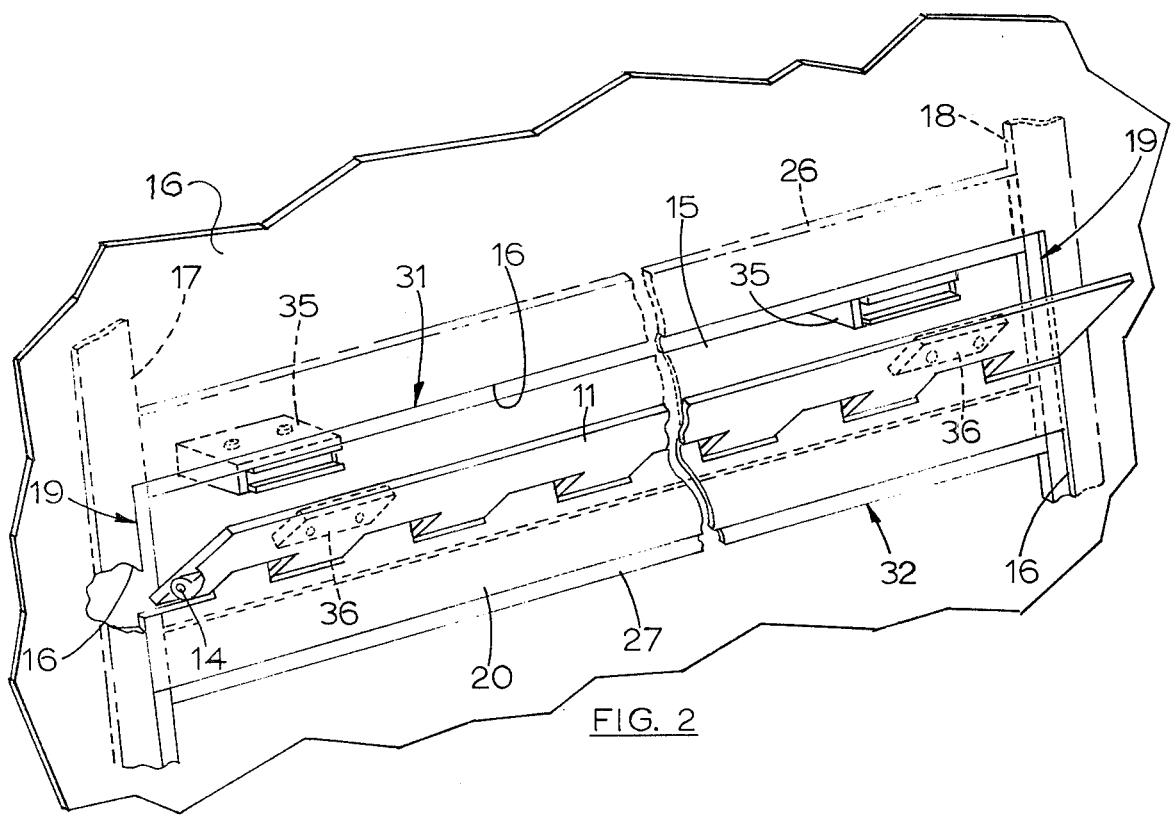
FIG. 2 is a detailed perspective diagram of the upper gun bay louver in an open position, showing its installation.

FIGS. 1 and 2 show that gun bay door 8 is provided with a rectangular cutout 15 extending through an outer metal door cover 16. Each end of cutout 15 extends to a point which exposes a portion of forward and rear door stiffeners 17 and 18, thereby providing side stops 19 for flat pressure relief louvers 11, 12 and 13, which are each a single continuous piano hinge segment hinged about continuous hinge pins or wires 14, 14a and 14b, respectively. Extending longitudinally in relation to cutout 15 are structural braces 26, 27, 28, and 29. Each brace has one of its ends attached to forward door stiffener 17 and its other end attached to rear door stiffener 18. A portion of the end of the inturning hinge bead and of the hinge pin are removed from each end of the louvers to clear the stiffeners 17 and 18, as shown by the broken away corner of the louver 11 in FIG. 2. This allows a perfectly flat fit of the louvers against the stiffeners 17 and 18.

Now referring also to FIG. 3, structural brace 26, in addition to being attached to door stiffeners 17 and 18, is attached to outer cover 16 in a structural relationship which provides a top stop surface 31 for the upper pressure relief louver 11. A lower piano hinge part 20 of hinge 14 is fixed to structural brace 27 which also provides a top stop surface 32 for pressure relief louver 12. Lower hinge part 20 of course carries the hinge pin 14 also. A lower hinge part 21 of hinge 14a is fixed to structural brace 28 which provides a top stop surface 33 for pressure relief louver 13. A lower part 22 of hinge 14b is fixed to structural brace 29 which is, in turn, also attached to outer cover 16.

Permanent magnet assemblies 35 are attached as by bolts at three locations along each of the lower surfaces of structural braces 26, 27 and 28. Each magnet assembly 35 consists of a permanent magnet bonded to a steel pole piece or pieces having mounting holes therein. The entire assembly 35 except for the magnetic contacting surface 39 is housed in an open-face fiberglass box 40. In this particular application of the present invention, the pressure relief louver is manufactured from a non-magnetic material; therefore, armatures 36 of sheet steel are attached as by riveting or bonding to the inner surface of each pressure relief louver 11, 12 and 13 near the top thereof in an opposing relationship to magnet assemblies 35 and provide the magnetic attraction required for proper operation of the present invention. It is possible, however, to have the locations of the magnets and armatures reversed.

Each of the permanent magnet assemblies 35 is set back toward the inside of gun bay 6 a distance which assures that when armatures 36 are in contact with magnetic contacting surfaces 39, pressure relief louvers 11, 12 and 13 form a flush surface in relation to outer metal cover 16, as shown in FIG. 4.

Thus it is seen that a very simple, reliable and fast-acting pressure relief means is provided by this invention. Since the louvers are of single-piece piano-hinge type fabrication, there is a continuous hinge connection along the louver. Of course, an alternate construction could use a single separate hinge at each end, or with one added at the center of the louver hinge line, but this would be more complex and might result in a bowing out of the louver between the hinge points with the more intense explosions. Further, spring-loaded hinges might be used but they are also more complex and result in too high a closing force when wide open, thereby not venting the explosion as thoroughly as the magnetic holders do. In one embodiment of the present louver (approximately 20 inches long and 1½ inches wide) using the preferred magnetic latches, the louvers open 30° in 18 milliseconds or less, for example, in the event of a gun gas explosion, while providing a holding force of about 100 pounds in the closed louver position. If an electrically operated louver latch release system were employed, the time delay would be too great. The hinge center-line must be approximately a straight line, of course, to allow free opening movement for as far as necessary.

MODE OF OPERATION OF INVENTION

In the event of a low level explosion in gun bay 6 for which the airflow purge scoop 4 and air exit 5 are inadequate, pressure relief louvers 11, 12 and 13 will automatically open to approximately the position shown in FIG. 3. They will still be within magnetic pull range of permanent magnets 35 and urged to the closed position shown in FIG. 4 as the pressure in gun bay 6 subsides. This prevents structural damage to the gun bay door 8 and other aircraft parts.

In the event a stronger explosion in gun bay 6 forces the pressure relief louvers 11, 12 and 13 out of the magnetic range of permanent magnets 35, they will be moved toward a closed position by an upward component of the normal air flow around the aircraft body and be returned to the closed position by the magnetic attraction of permanent magnets 35 once they are within the magnetic field.

It is understood that various changes in the detail, materials and arrangement of parts, which have been herein described and illustrated in order to explain the nature of the present invention, may be made by those skilled in the art within the principle and scope of the invention as expressed in the appended claims without departing from the spirit of the invention.

I claim:
1. In combination with an aircraft having a gun bay and gun bay door in the side thereof; pressure relief means comprising:
   a. means defining a cutout in said gun bay door;
   b. a continuous hinge having an upper and a lower section hinged together by a continuous hinge pin;
   c. said lower section being fixed to said gun bay door in the lower portion of said cutout and forming a flush outer surface with said gun bay door;
   d. said upper section dimensioned to cover the upper portion of said cutout when in a closed position and rotatable outwardly and downwardly to an open position during internal pressure buildup within said gun bay due to gun gas explosion;
   e. said upper section being automatically moved toward said closed position by normal in-flight upward flow of air around said gun bay door, as said pressure subsides; and
   f. holding means to maintain said upper section in said closed position flush with the outer surface of said door under normal flight conditions.

2. The invention as defined in claim 1 wherein said holding means comprises a magnet attached within said gun bay, and magnetic attraction means on said upper section in adjacent holding relation with said magnet when said upper section is closed.

3. The invention as defined in claim 1 including structural bracing members on the inner side of said gun bay door adjacent to said cutout, at least one of said members having a portion thereof extending toward the middle of said cutout beyond at least one edge of said cutout in the path of said upper hinge section, said portion defining a stop surface for said upper hinge section in said closed position thereof.

4. Means for relieving the pressure from a gun gas explosion in an aircraft, comprising:
   a. a louver covering an opening in the outer surface of said aircraft adjacent to the gun installation;
   b. said louver being hinged at a lower edge thereof which is longitudinal with respect to said aircraft;
   c. said louver being openable outwardly and downwardly with respect to its said lower edge;
   d. means normally holding said louver in a closed position essentially flush with said aircraft outer surface;
   e. said holding means being releasable under internal pressure caused by a gun gas explosion to force said louver open; and
   f. said louver being located where normal in-flight air flow across said louver has an upward component capable of moving said louver from an open position toward said closed position.

5. Apparatus in accordance with claim 4 wherein said louver is substantially flat and wherein the lower edge hinge line is essentially straight, said louver having a length along its hinge line substantially greater than its width.

6. Apparatus in accordance with claim 4 including a plurality of said louvers arranged closely side by side.

7. Apparatus in accordance with claim 4 wherein said holding means comprises at least one permanent magnet attached to said aircraft near the top of said opening just inboard of said closed position of said louver.

8. Apparatus in accordance with claim 4 wherein said holding means comprises at least one permanent magnet attached to said aircraft near the top of said opening just inboard of said closed position of said louver, and a magnetic armature element attached on the inner side of said louver in position to abut said magnet in said closed louver position.

9. Apparatus in accordance with claim 4 wherein said louver lower edge is one notched segment of a continuous piano hinge, and including a mating piano hinge segment fixed to said aircraft, with a continuous hinge wire through said segments for connection thereof.

10. Apparatus in accordance with claim 4 wherein said louver comprises a single, integral, continuous piano hinge segment having a width and length fitting the upper portion of said opening, and having a thickness substantially matching that of the surrounding outer surface of said aircraft.

11. Apparatus in accordance with claim 10 including a similar continuous complementary piano hinge segment fixed to said aircraft as an outer surface element fitting the lower portion of said opening, said segments being hinged together by a hinge pin wire.

\* \* \* \* \*